United States Patent
Lundbäck (10) Patent No.: US 6,458,282 B1
(45) Date of Patent: Oct. 1, 2002

(54) METHOD AND APPARATUS FOR SEPARATING FLOATING POLLUTANTS

(75) Inventor: Stig Lundbäck, Vaxholm (SE)

(73) Assignee: Surfcleaner AB, Stockholm (SE)

(*) Notice: Subject to any disclaimer, the term of this patent is extended or adjusted under 35 U.S.C. 154(b) by 0 days.

(21) Appl. No.: 09/530,263

(22) PCT Filed: Oct. 28, 1998

(86) PCT No.: PCT/SE98/01955

§ 371 (c)(1),
(2), (4) Date: Apr. 28, 2000

(87) PCT Pub. No.: WO99/22078

PCT Pub. Date: May 6, 1999

(30) Foreign Application Priority Data

Oct. 29, 1997 (SE) .................................................. 9703955
Sep. 30, 1998 (SE) .................................................. 9803322

(51) Int. Cl.[7] .................................................. C02F 1/40
(52) U.S. Cl. ..................... 210/776; 210/242.3; 210/923
(58) Field of Search ............................... 210/776, 242.3, 210/242.1, 923

(56) References Cited

U.S. PATENT DOCUMENTS 3,853,768 A    12/1974   Bagnulo
4,132,645 A  * 1/1979    Bottomley et al. ......... 210/522
5,154,835 A  * 10/1992   DeMichael ............... 210/242.3
5,713,697 A  * 2/1998    Steiner ..................... 210/242.3
6,015,501 A  * 1/2000    Lundbäck ................ 210/242.3

FOREIGN PATENT DOCUMENTS

DE    2 030 209      12/1971
SE    418 629        6/1981
SE    507 548        6/1998
WO    94/17250       8/1994
WO    97/07292       2/1997

* cited by examiner

Primary Examiner—Robert J. Popovics
(74) Attorney, Agent, or Firm—Browdy and Neimark, P.L.L.C.

(57) ABSTRACT

Method and apparatus for cleaning an open surface of a body liquid, especially for recovering oil spills or other floating pollutants. A surface portion of the water carrying pollutants is caused to flow across a skimming weir (12, K) forming an inlet to a collecting vessel (11) and to proceed downwardly within the collecting vessel. At least the main portion of the downwardly flowing polluted water is then diverted laterally outwardly into a separation zone (B) in which the pollutants are allowed to separate from the water and collect on a confined surface of the water. The separation zone (B) may be integrated in the collecting vessel (11) and provided around a central collection compartment (A) provided with an annular skimming weir (12, K). Alternatively, the skimming zone may be provided in a separate vessel connected with the collection vessel through a conduit.

5 Claims, 8 Drawing Sheets

METHOD AND APPARATUS FOR SEPARATING FLOATING POLLUTANTS

CROSS REFERENCE TO RELATED APPLICATION

This present application is the national stage under 35 U.S.C. 371 of PCT/SE98/01955, filed Oct. 28, 1998.

This invention relates to cleaning of the surface of a body of liquid. More particularly, the invention relates to a method and apparatus for recovering floating pollutants, such as oil spills, from the surface of open or confined waters.

The invention is particularly useful for recovering oil floating on water and will therefore be described with particular reference to its application for that purpose. However, the invention is not limited to recovering oil or other liquid pollutants, and the term pollutant as used herein should be understood to include, in addition to liquid substances of high or low viscosity, more or less solid debris or objects of relatively small dimensions.

WO97/07292 discloses a method and apparatus for skimming a surface portion of a body of water to flow into an immersed collection vessel for the purpose of cleaning the water surface. A pollutant, especially oil, floating on the water surface surrounding the collection vessel is caused to flow into a water sink formed in the collection vessel and allowed to separate from the water by virtue of its buoyancy and build up a layer on the water surface of a separation zone. The layer so formed on the surface of the water sink is intermittently or continuously withdrawn from the separation zone and disposed of in any suitable manner.

A surface portion of the surrounding water carrying the pollutant is caused to flow across the crest of a vertically self-positioning skimming weir which is preferably annular. To this end, water is withdrawn from the lower region of the collection vessel to maintain the water sink in the collection vessel so that the level of liquid in the collection vessel is below the level of the surrounding water surface.

In operation, the skimming weir, which possesses some buoyancy, takes an overflow position relative to the surrounding water surface such that the inflow into the collection vessel is automatically regulated to match the outflow of water from it.

The separation zone includes a generally round area of the water surface in the water sink and the water below that area. At the top portion thereof, the separation zone is horizontally spaced inwardly from the weir and preferably separated from the weir by an annular baffle serving to prevent the pollutants from entering the separation zone without first being deflected downwardly.

A characteristic feature of the known method and apparatus is that the separation of the pollutants carried by the water into the collection vessel takes place in a step which is subsequent to the skimming. In other words, there is no provision for ensuring that the liquid entering the collection vessel includes substantially only the pollutants. Instead, large amounts of water are allowed to enter the collection vessel and by ensuring that the subsequent separation step efficiently separates the pollutants from the mixture of water and pollutants a concentrated pollutant layer is obtained in the separation zone.

If the pollutants have a density which is only slightly lower than that of the water, as is the case with most pollutants consisting of petroleum products, an efficient separation of the pollutants from the mixture of water and pollutants is possible only if the flow velocity of the mixture is very low.

It has been found that the mixture of water and pollutants flowing across the skimming weir like a waterfall or cascade tends to flow more or less vertically downwardly as a relatively confined stream in the liquid contained in the collection vessel. Moreover, it has been found that the stream loses its momentum only slowly, so that it can easily reach the bottom region of the collection vessel, where water is discharged.

It is important, therefore, to provide for the flowing mixture to reduce its velocity drastically so that the separation in the separation zone can take place efficiently. In the above-described known apparatus a reduction of the velocity can be brought about by widening the separation zone and allowing the downwardly flowing mixture to deflect at least partially into the separation zone and distribute there across a large area.

However, in the known method and apparatus, widening of the separation zone also means that the annular skimming weir has to be widened. This in turn means that the inflow across the skimming weir is increased and that the reduction of the velocity in the separation zone will therefore be limited.

This limitation is avoided in the method and apparatus according to the invention the features of which are set forth in the independent claims and preferred embodiments of which include features set forth in the dependent claims.

As will become apparent as the description proceeds, in the method and apparatus according to the invention the separation zone is horizontally offset from the region beneath the water sink in the collection vessel. This is in contrast to the prior art as described above, in which the separation zone is within the region beneath the water sink in the collection vessel.

In one preferred embodiment of the invention the separation zone is annular and surrounds the region beneath the water sink. It can then be expanded horizontally virtually without limitation so that its horizontal cross-sectional area can readily be chosen as desired to produce the desired low flow velocity. Expansion can be accomplished without any expansion the skimming weir and the water sink being necessary. The downward flow of the mixture of water and pollutant can be deflected radially outwardly in all directions and spread across a horizontal cross-sectional area the size of which is a function of the square of the distance of the outer perimeter from the centre.

In accordance with a second preferred embodiment, the separation zone is provided in a separation vessel which is horizontally spaced apart from the collection vessel and connected to it through a conduit through which the mixture of water and pollutant is conveyed from the collection vessel to the separation vessel in which the accumulation of the pollutants on a water surface takes place. Both the collection vessel and the separation vessel may be positioned in the body of water which carries the pollutant.

Preferably, the stream of water carrying the pollutant is introduced into the separation vessel through a vertically extending, upwardly opening outlet conduit and, likewise preferably, the upwardly directed stream exiting from the outlet conduit is diverted downwardly through an annular zone which surrounds the outlet conduit and the lower end of which communicates with the separation zone.

In this second embodiment as well, the horizontal dimensions of the separation zone can readily be chosen virtually as desired to present a cross-sectional area to the stream entering the separation zone which is large enough to reduce the flow velocity very substantially.

The invention will be described in greater detail below with reference to the accompanying diagrammatic drawings and exemplary embodiments of the method and apparatus according to the invention illustrated therein.

The embodiments of the apparatus according to the invention which are shown in FIGS. 1–8 and 10–15 are intended to float in the body of water which carries the pollutant material to be recovered; this material is of a density lower than that of water and is here presumed to be chiefly oil but it may also be or include more or less solid debris of various kinds. The basic structure and operation are essentially the same as those of the known recovering apparatus illustrated and described in WO97/07292 and therefore will not be explained in detail here. like the known apparatus discussed above, the recovering apparatus of FIGS. 1 and 2 comprises a collection vessel, generally designated by 11, of circular cross-section, which is immersible in the body of water. It defines a central collection compartment A and an annular separation compartment B which surrounds the lower portion of the collection compartment. The collection and separation compartments A and B are in open communication with one another in a zone C near the bottom wall 14 of the collecting vessel 11.

Figure 1:
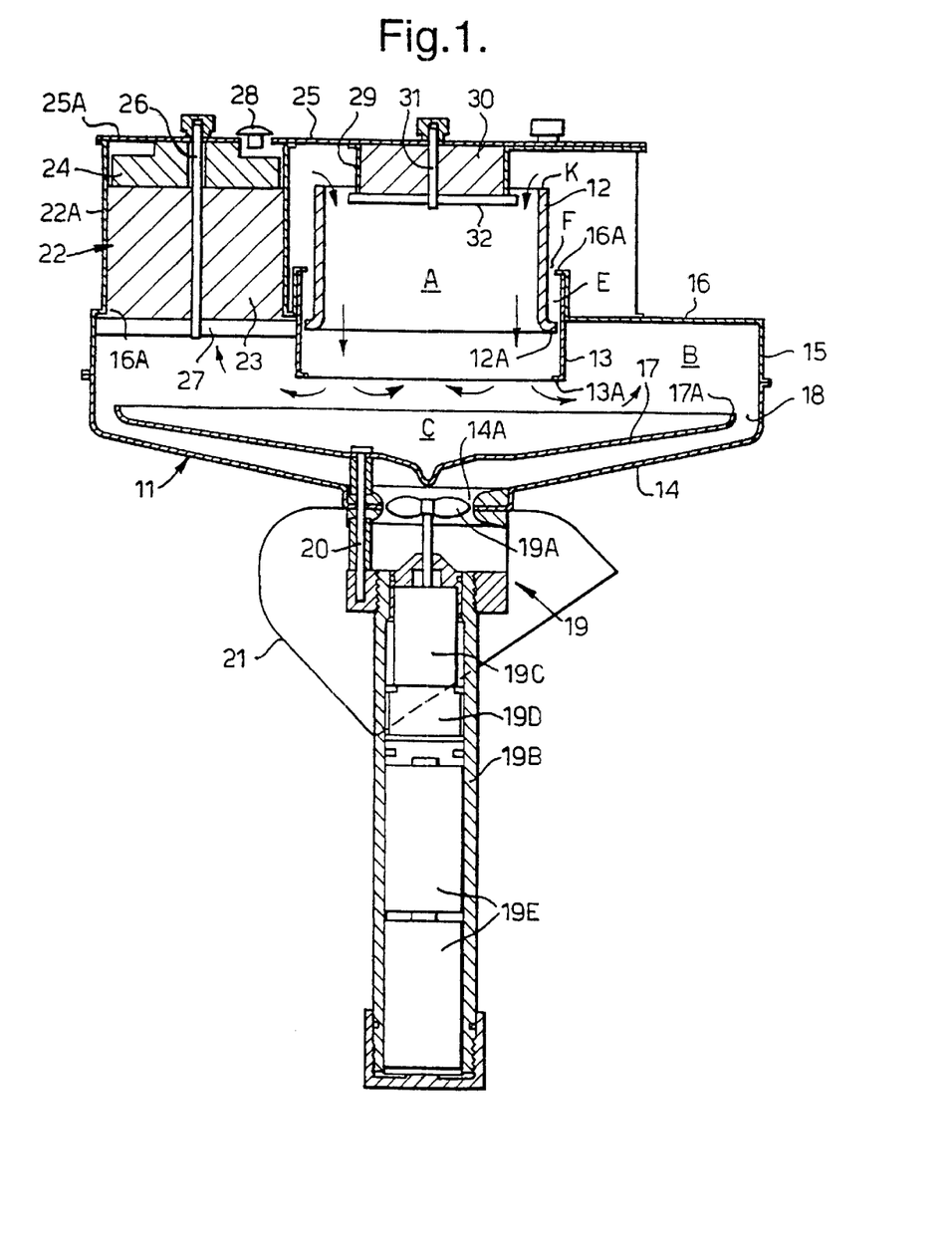
FIGS. 1 and 2 are respectively a vertical sectional view and a plan view of a first embodiment.
Figure 2:
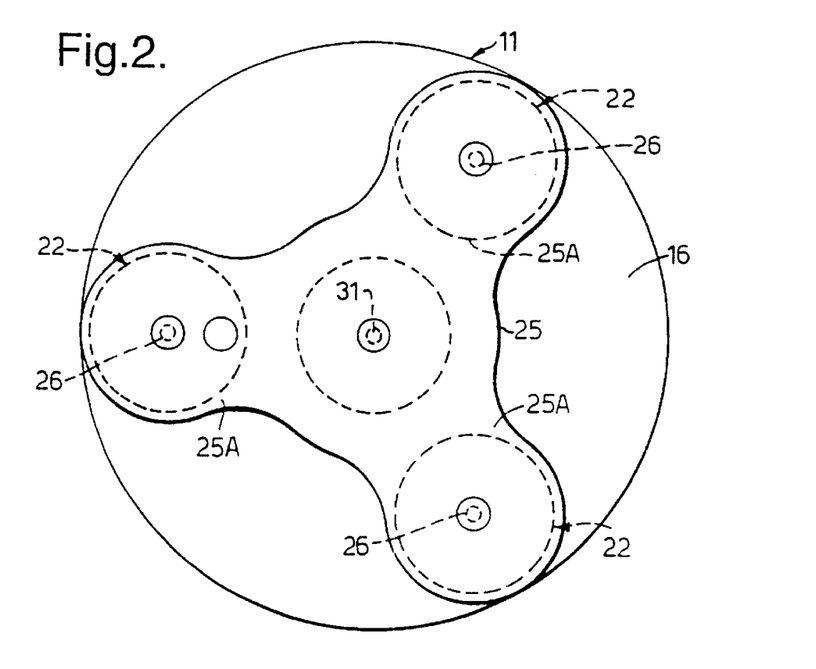

A circular inlet opening of the collection compartment A is defined by an annular overflow crest K of a skimming weir in the form of a circular cylindrical upper wall part 12. The collection compartment A is delimited laterally partly by the upper wall part 12 and partly by a lower wall part 13 which is also circular cylindrical and concentric with the upper wall part. A likewise generally circular cylindrical outer wall 15, the diameter of which is substantially larger than the diameter of the wall parts 12 and 13, in the illustrated embodiment 2 to 2.5 times larger, delimits the separation compartment B outwardly.

Between the lower wall part 13 and the outer wall 15 an annular horizontal wall 16 is provided which is rigidly secured to these walls and forms a top wall of the separation compartment B. The lower wall part 13 extends downwardly beyond the wall 16 but ends well above the bottom wall 14 of the collection vessel 11 so that there is a large open area between the collection and separation compartments A and B allowing a substantially unrestricted flow between these compartments.

The upper wall part 12 is telescopically received in the lower wall part 13. It accordingly can move up and down relative to the lower wall part within a movement range which is defined by inwardly directed annular flanges 13A and 16A on respectively the lower wall part 13 and the horizontal wall 16. An outwardly directed annular flange 12A on the upper wall part 12 extends to the inner side of the lower wall part 13 and together with the flange 16A defines a hydraulic dash-pot compartment between the upper wall part 12 and the lower wall part 13. Between the flange 16A and the upper wall part 12 a flow passage F is provided through which a restricted liquid flow can pass between the dashpot compartment E and the surrounding body of water in which the collecting apparatus operates.

The upper wall part 12 has some buoyancy in water, that is, its weight is matched with its volume such that it floats in water. When the wall part 12 is immersed in a body of water and is not subjected to any force other than the gravity force and the hydrostatic buoyant force, its upper end defining the crest K of the skimming weir accordingly will be somewhat higher than the water surface.

The upper wall part 12 and the lower wall part 13 together form an inner wall the height of which is variable such that the elevation of the skimming or overflow crest K with respect to the lower wall part 13 and the horizontal wall 16 can vary.

Slightly spaced above the bottom wall 14 of the collection vessel is a circular plate 17 the circumferential edge 17A of which is slightly spaced inwardly from the outer wall 15 to define with that wall an annular passage 18 through which water can flow from the collection compartment A to and through the bottom wall opening 14A into the surrounding body of water, and of course also in the opposite direction.

For effecting the water transport between the collection compartment A and the surrounding body of water a battery-powered reversible pump, generally designated by 19, is provided which comprises an impeller 19A in the form of a propeller disposed in the bottom wall opening 14A. The pump 19 includes a housing 19B accommodating the electric pump motor 19C, an electronic control unit 19D and batteries 19E. The pump is releasably mounted on the bottom wall 14 by means of struts 20 (only one is shown) which also support the plate 17.

Associated with the pump is a nozzle 21 which surrounds the bottom wall opening 14A and the outlet of which is directed obliquely downwardly from the bottom wall opening. When the pump 19 operates to pump water from the interior space of the collecting vessel into the surrounding body of water, this nozzle directs the outgoing stream of water obliquely downwardly to apply to the collecting vessel a propelling force having a horizontal component.

Given a suitable dimensioning and shaping of the nozzle with regard to the pump power, this propelling force in combination with the tendency of the pump propeller to rotate the entire apparatus may cause the recovering apparatus to move along a winding or circulatory path in the body of water, provided that the apparatus is not confined or constrained in some way. Because the water stream from the nozzle 21 is directed downwardly, its interference with the water surface around the apparatus is minimized.

Radially outwardly of the lower wall part 13 the horizontal wall 16 is formed with three circumferentially uniformly spaced circular openings 16A. Directly above these openings three buoyancy units 22 having a rigid circular cylindrical wall 22A are provided. Inwardly of this wall an absorber body 23 is provided in the lower portion, and a buoyancy body 24, made of styrene plastic, for example, is provided in the upper portion.

Positioned above the three buoyancy units 22 is a three-armed top plate 25 the arms 25A of which engage the upper end of the walls 22A in airtight fashion. A tie rod 26 passes axially centrally through each buoyancy unit 22 and keeps the wall 22A of the buoyancy unit clamped between the horizontal wall 16 and the top plate 25 using a cruciform member 27 for support.

In the top plate 25 above each buoyancy unit 22, there is also a one-way valve 28 enabling air within the buoyancy unit to be expelled upwardly but preventing air from entering the buoyancy unit in the opposite direction.

An annular collar 29 accommodating a capillary oil-absorber body 30 is mounted centrally on the lower side of the top plate 25. A central tie rod 31 clamps the annular collar to the lower side of the top plate using a cruciform member 32 for support.

It should be noted that the one-way valves associated with the buoyancy units are not always necessary. For example, if a superabsorbent material is used instead of capillary absorbents, the one-way valves can be omitted.

When the collecting apparatus is placed in a body of water, such as in open water or in a confined area, like a pool or an area delimited by floating booms, the collection vessel 11 will be rapidly filled with water, and the entire apparatus will take an elevation relative to the water such that the water will be slightly lower than the top plate 25. The absorber bodies 23 will also be more or less completely filled with water which dispels the air in them through the valves 28.

During operation of the pump 19 to discharge water from the interior of the collection vessel 11 downwardly into the surrounding body of water, a water sink will develop and be maintained in the collection compartment A. Because of the difference in water levels between the collection compartment A and the water surrounding the collection vessel 11, the upper wall part 12 with its skimming or overflow crest K will take an overflow position with respect to the water surface. Accordingly, the water sink maintained in the collection compartment A will be continuously refilled with water and oil.

The upper wall part 12 is self-adjusting or self-positioning with respect to the surrounding water surface in dependence on the amount of water being pumped out relative to the amount of water flowing in. In other words, the upper wall part 12 operates to move up and down to maintain a balance between the outflow and the inflow.

The inflow of water and oil across the overflow crest K of the skimming weir under the action of the pump 19 causes a waterfall or cascade along the overflow crest K. The in-flowing mixture of water and oil will therefore proceed downwardly within the collection compartment A as a generally cylindrical curtain-like stream of liquid past the horizontal lower end of the lower wall part 13.

This stream will only slowly lose its momentum and accordingly will fairly easily go into and through the zone C where it will be deflected to some degree inwardly and upwardly back to the surface in the collection compartment and to a much greater extent radially outwardly toward the outer wall 15. This flow pattern is indicated by arrows in FIG. 1 (see also FIG. 7).

The portion of the water-oil stream which is deflected radially outwardly around the lower edge of the lower wall part 13 will be distributed over a very large cross-sectional flow area as it passes through the region of the zone C which is beneath that wall part. Accordingly, the flow velocity will be drastically reduced as soon as the stream is deflected laterally to pass through that region, and the velocity will be further reduced as the stream proceeds outwardly. The flow velocity will therefore be sufficiently reduced to allow the droplets of oil to rise into the separation compartment B and collect at the surface of the water in that zone whereas fairly clean water is withdrawn through the gap 18 adjacent the outer wall 15.

From the separation space B the oil may pass through openings 16A in the horizontal wall 16 and become absorbed in the absorber bodies 23.

After some time, as determined by the electronic control unit 19D, the pump 19 may be reversed to pump water into the collection vessel 11. The water level in the collection compartment A will then rise, thereby causing the upper wall part 12 to engage and seal against the top plate 25. Oil collected on the water surface inwardly of the wall part 12 will then be forced into the absorber body 30, and at the same time oil on the water surface in the separation compartment B can be forced into the absorber bodies 23.

The above-described procedure can be repeated a smaller or larger number of times, and finally the collecting apparatus can be recovered. If desired, the absorber bodies 23 and 30 may be emptied of their oil, such as for sampling and/or recycling or destruction.

As mentioned above, a portion of the water-oil stream flowing downwardly from the overflow crest K along the interior side of the upper wall part 12 is deflected inwardly and upwardly at the bottom zone C. This deflected portion will also carry with it some oil, which will collect on the surface in the collection compartment A and either build up a layer there or be more or less immediately recycled to and entrained in the oil-water stream flowing downwardly from the overflow crest.

Oil spills on water surfaces sometimes are in the form of extremely thin and light oil films, so-called sheen. Such oil spills are extremely difficult to recover with prior art apparatus, because oil in very thin layers is very reluctant to be drawn into the skimming vessel. However, the apparatus according to the present invention has been found to be capable of recovering sheen quite efficiently.

Collection of sheen on the water around the skimming vessel to be efficient requires a certain minimum height, at least a few centimetres, of the waterfall or cascade at the entrance to the skimming vessel. Otherwise, because the friction between the water and the oil is almost non-existent, the flow velocity of the water flowing across the skimming weir will be insufficient to pull the extremely thin film of oil across the skimming weir into the collecting vessel.

Because of its thinness, the sheen entering the water sink in the collecting vessel is also very reluctant to be drawn directly downwardly in the water. Instead, it will tend to stay on the water surface. However, the omnidirectional inflow into the water sink inside the skimming weir, will cause the sheen to be pushed together an form a gradually thickening layer, and after some time the oil will form droplets which are entrained and carried downwardly by the stream of water proceeding downwardly adjacent the skimming weir.

Figure 3:
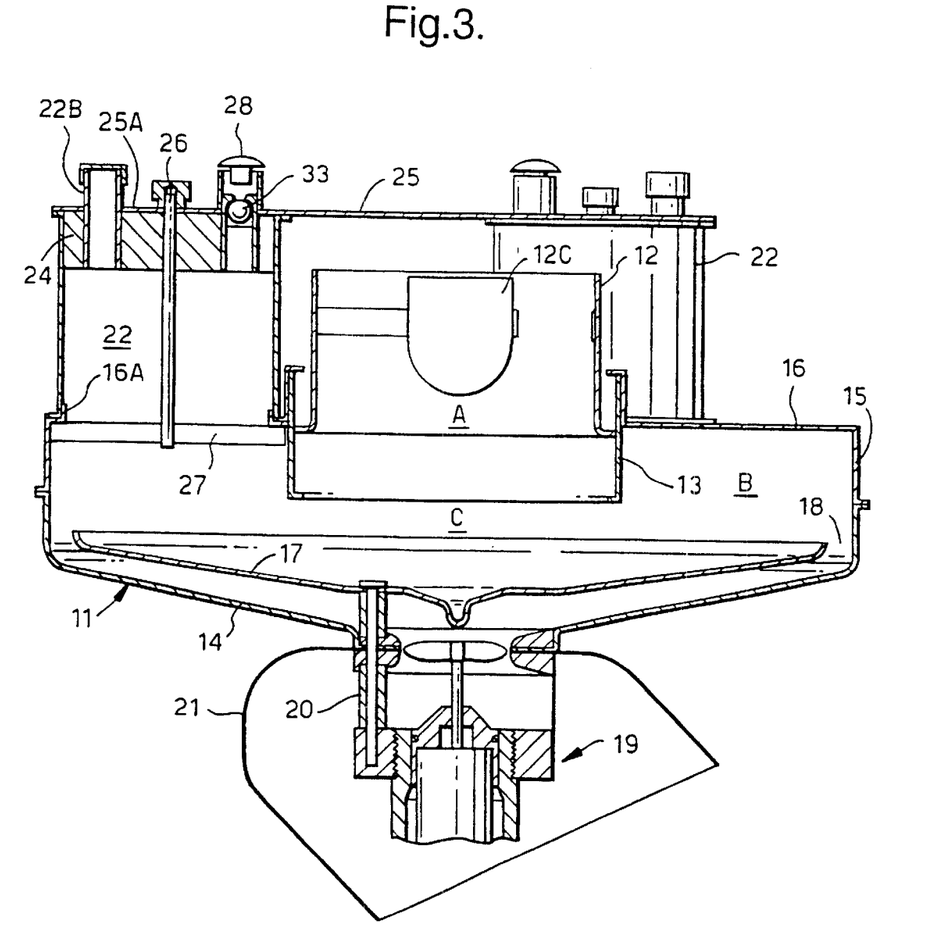
FIGS. 3 and 4 are views corresponding to FIGS. 1 and 2 showing a second embodiment.
Figure 4:
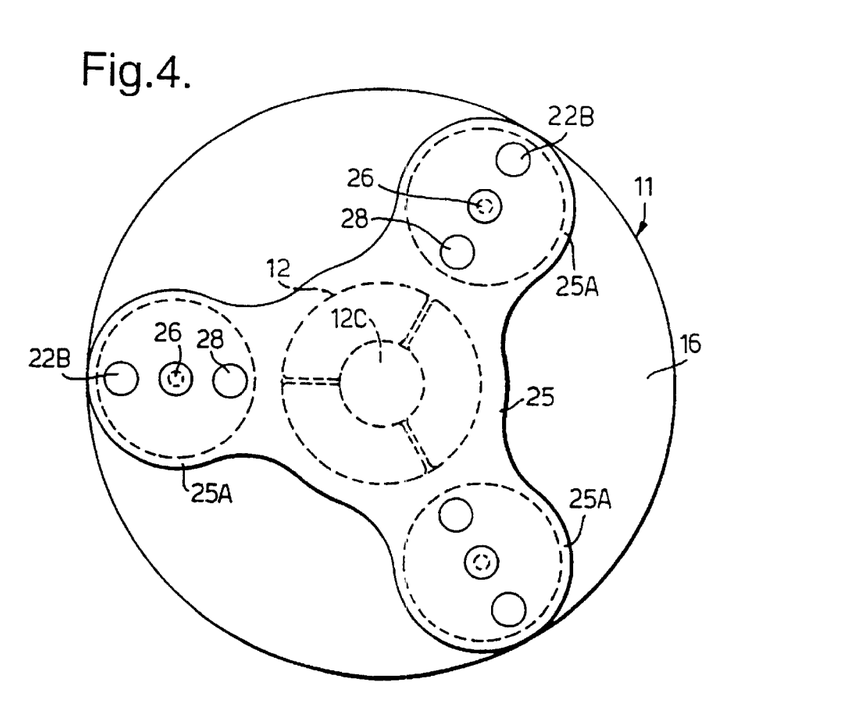
Figure 5:
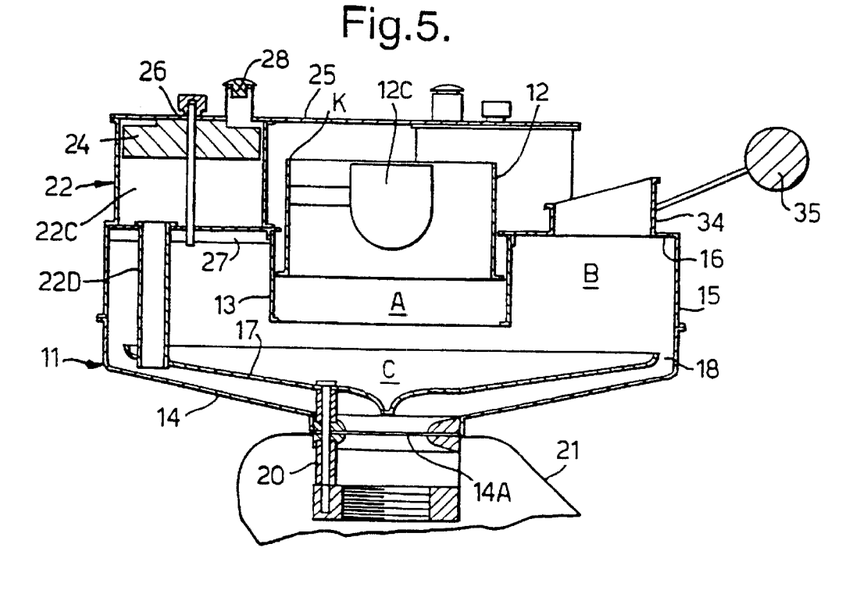
FIGS. 5 and 6 are views corresponding to FIGS. 1 and 2 showing a third embodiment.
Figure 6:
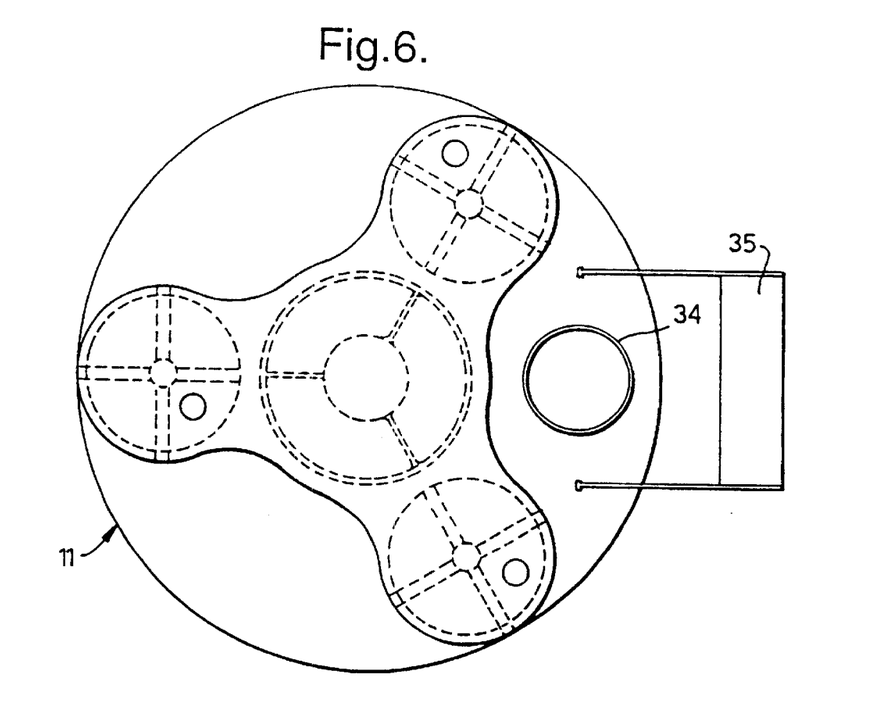

In the embodiment of FIGS. 3 and 4, which will be described only insofar as it differs from the embodiment of FIGS. 1 and 2, the upper wall part 12 is provided with a separate, centrally positioned buoyancy body 12C. Moreover, at least one of the three buoyancy units 22, preferably all of them, is arranged such that the oil can be discharged upwardly from the buoyancy unit through a tubular connector 22B which is provided on the top plate 25 and to which a hose or other suitable auxiliary member can be attached. In this embodiment there is no absorber body corresponding to the central absorber body 30 in the embodiments of FIGS. 1, 2. In order that air, but not oil or water, may be expelled through the one-way valve 28, a further one-way valve 33 having a ball-shaped valve body is provided below the valve 28.

The embodiment of FIGS. 5 to 8 is the same as the embodiment of FIGS. 3 and 4 in respect of the upper wall part and its buoyancy body 12C. In this embodiment, however, the buoyancy units 22 are not used for collecting oil, but only as buoyancy bodies or pontoons combined with a kind of ballast members in which the ballast is water. The collected oil is disposed of in a manner to be described.

The buoyancy units 22 in this case do not accommodate an absorber body but only the buoyancy body 24. Beneath the latter is a space 22C which communicates through a vertical tube 22D with the passage between the bottom wall 14 and the circular plate 17, so that pure water may rise into and fill the space 22C. Apart from the tube 22D and the one-way valve 28, the space 22C is sealed so that water that has risen into the space cannot readily escape downwardly through the tube 22D.

In this case the oil is withdrawn through a separate connector 34 on the horizontal wall 16. A wide hose S (FIGS. 7, 8) of a flexible material is attached to the connector. This hose by itself forms a sack or recipient container which floats on the body of water and is connected to a separate storage container. Optionally, a buoyancy body 35 in the shape of a horizontal cylinder may be attached to the collecting vessel to keep a section of the hose S elevated above the water surface and the upper end of the connector 34, whereby that hose section will always be slightly higher than other parts of the hose S.

Figure 7:
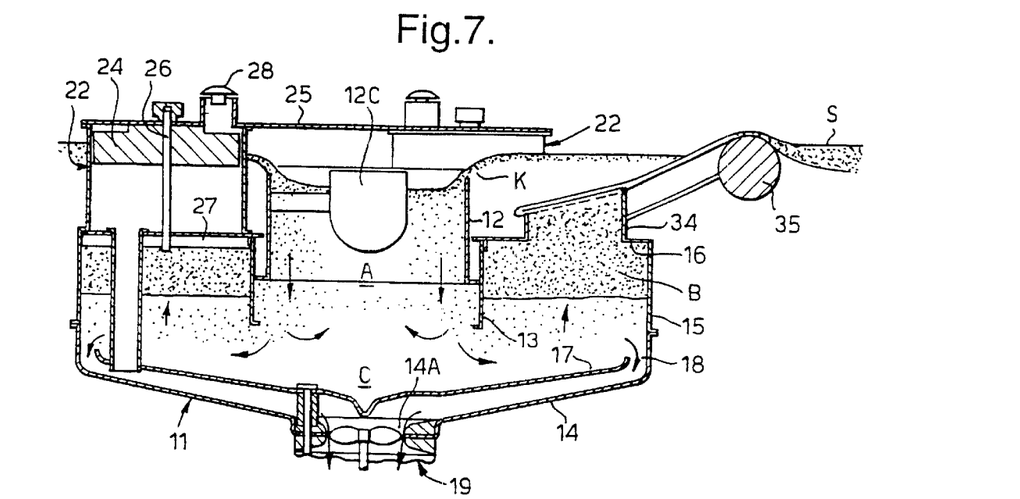
FIG. 7 is a view corresponding to FIG. 5 but showing the apparatus in operation.
Figure 8:
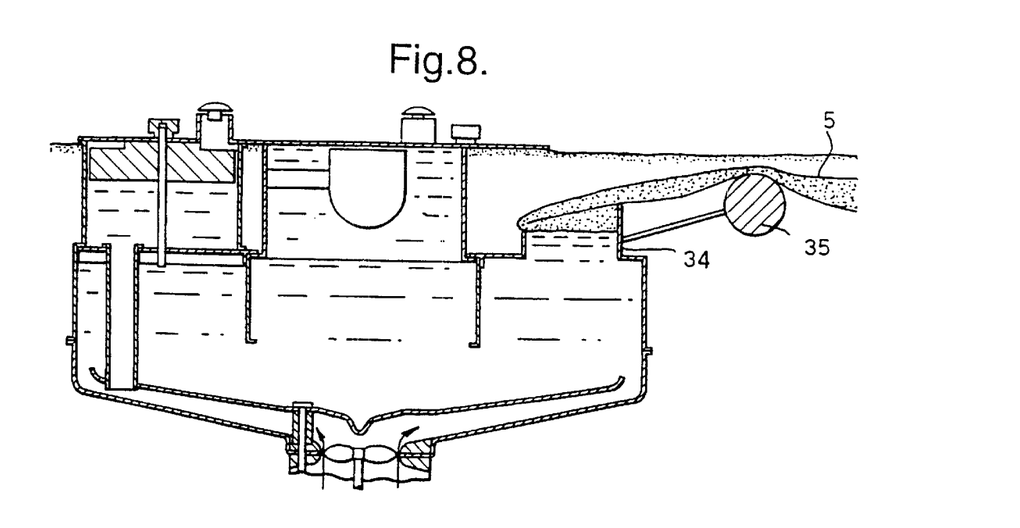
FIG. 8 shows the apparatus of FIG. 7 in a different state of operation.

When a sufficient amount of oil has been collected in the separation compartment B, the pump 19 is reversed to pump water into the collecting vessel 11 and thereby force the oil through the connector and past the elevated section of the hose S. The elevated hose section prevents oil from flowing back into the collection compartment A.

FIGS. 7, 8 diagrammatically illustrate the procedure whereby the collection is carried out. More particularly, FIG. 7 shows a stage in which the intake of water into the collection compartment A goes on and a certain amount of oil has already been collected in the separation compartment B, while FIG. 8 shows the stage in which the pump has been reversed and oil is being forced out through the connector and the hose S.

Figure 9:
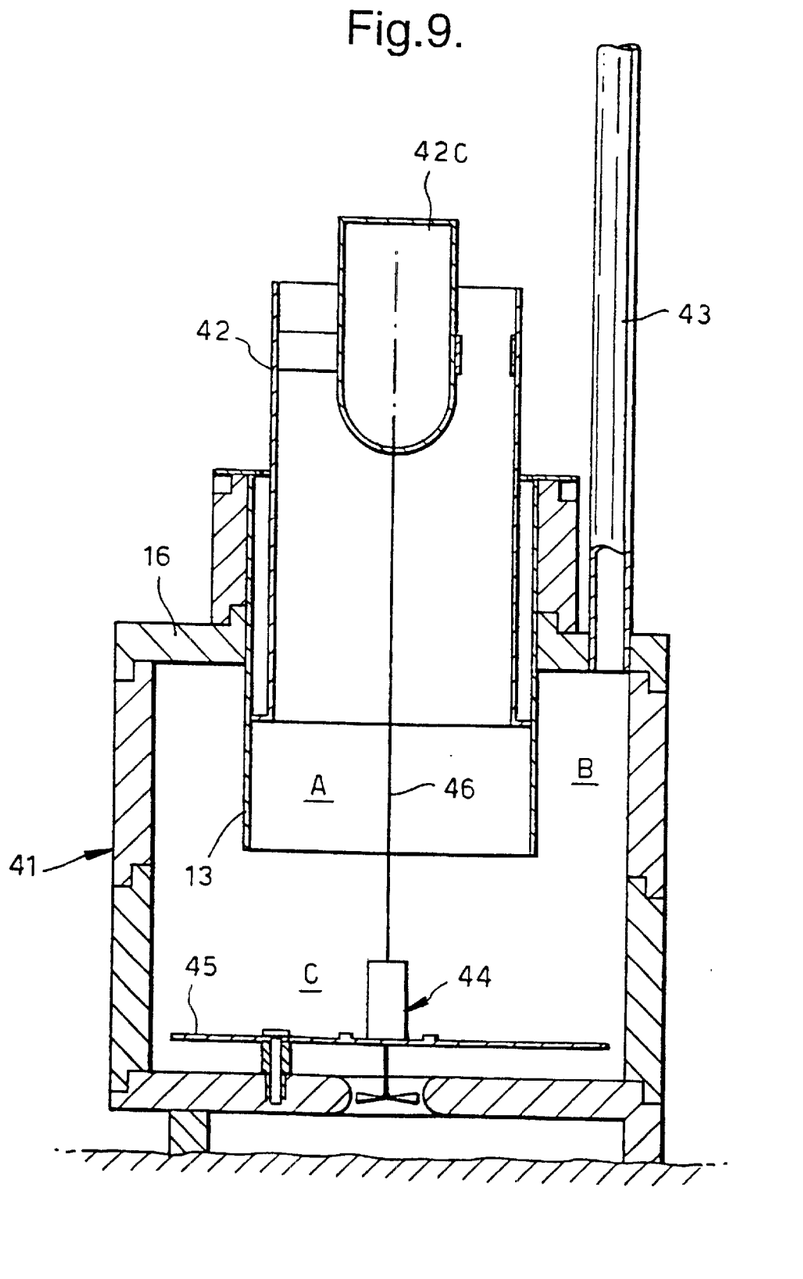
FIG. 9 is a vertical sectional view of a fourth embodiment of the apparatus according to the invention, namely an embodiment for stationary installation on a firm base.

While FIGS. 1 to 8 show apparatus intended to float in the body of water in which they operate, FIG. 9 shows an embodiment of the apparatus which is intended to be stationary and erected on a firm support of some suitable kind. For example, it may be positioned in a harbour basin or some other site where there is a constant demand for having a collecting apparatus available so that oil spills or other pollutants can be collected immediately.

In this embodiment the collecting vessel 41 is made up of elements of concrete or some other suitable material. The upper wall part 42 with the buoyancy body 42C is similar to the wall part 12 of FIGS. 3, 4. For the discharge of the oil accumulated in the separation space B of the collecting vessel a riser tube 43 is provided which may be connected to a suitable recipient container into which the oil may be transported by means of a suitable pump (not shown).

The pump 44 in this case is positioned inside the collecting vessel instead of being positioned below it as in the previous embodiments. It is set down on the circular plate 45 without being secured to it and is attached to a lifting cable 46 or some other suitable lifting member so that if desired it can be lifted from the collecting vessel 41 and just as easily put back in position again.

The embodiment shown in FIGS. 10–15 is also intended to float in the body of water the surface of which is to be cleaned. In this embodiment, however, the collecting vessel 61 and the vessel 62 providing the separation zone B are spaced apart and interconnected by an underwater conduit 63 through which the mixture of water and pollutants received by the collecting vessel is conveyed to the separation vessel 62 and the separation zone therein.

Figure 10:
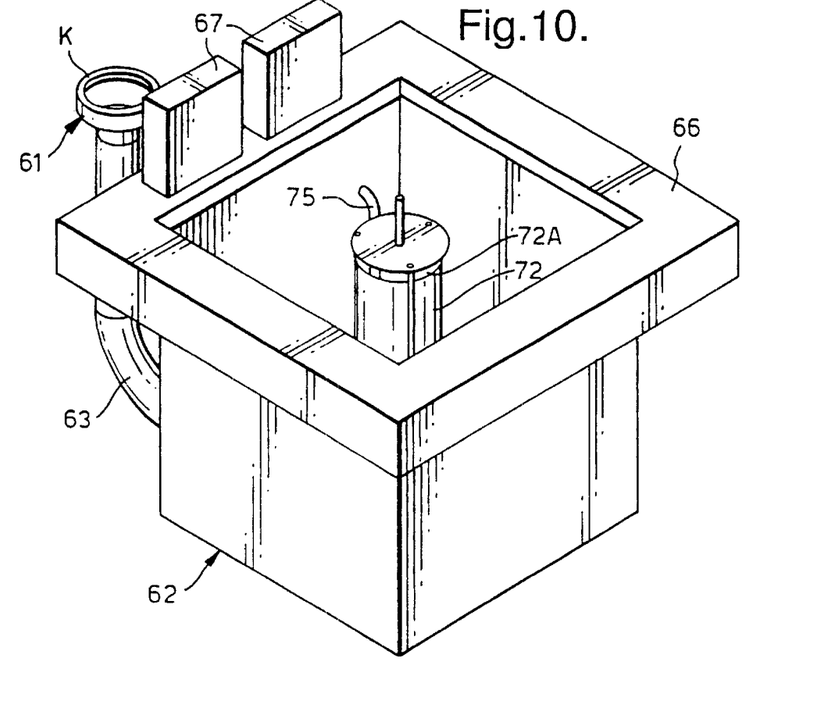
FIG. 10 is a perspective view of a fifth embodiment of the apparatus according to the invention in which the separation vessel is spaced apart from the collection vessel.
Figure 11:
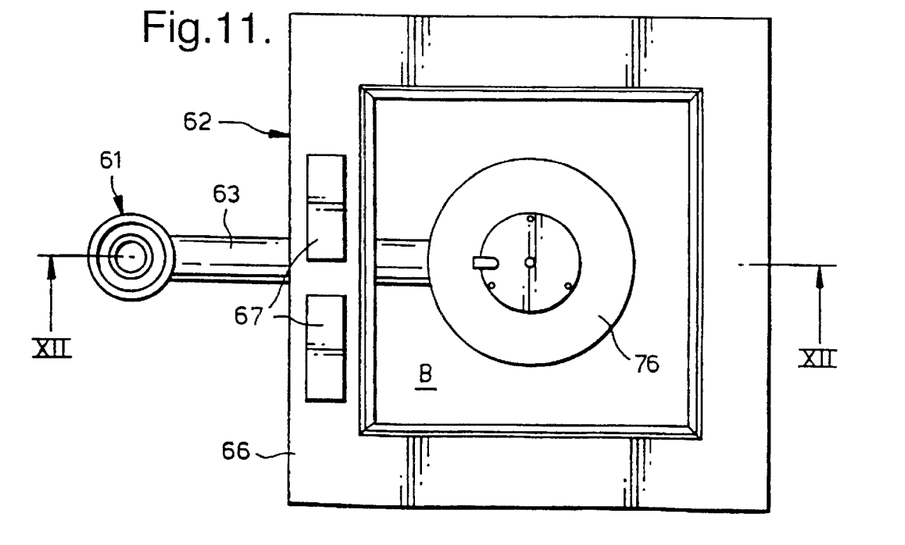
FIG. 11 is a plan view of the apparatus of FIG. 10.
Figure 12:
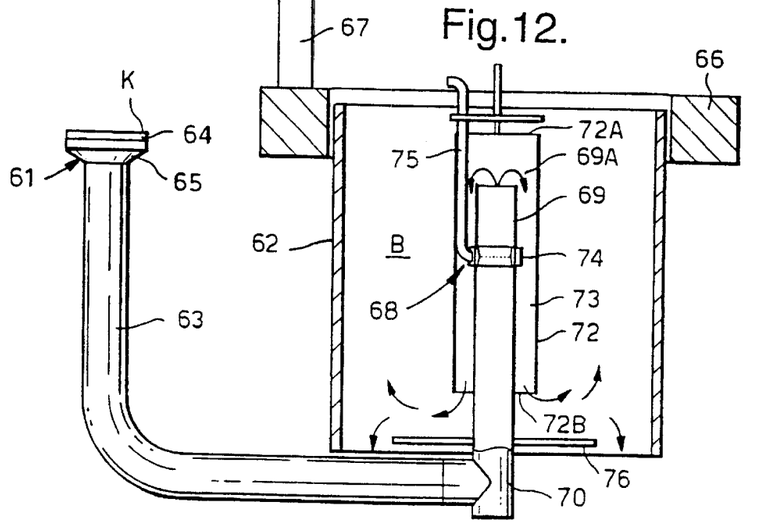
FIG. 12 is a vertical sectional view along line XII—XII of FIG. 11.
Figure 13:
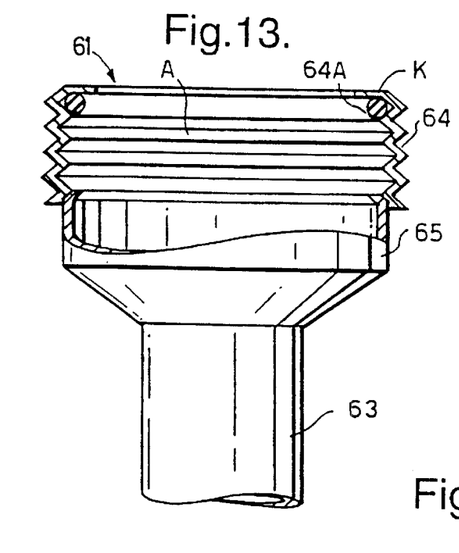
FIGS. 13–15 are enlarged sectional views showing details of the apparatus of FIGS. 10–12.
Figure 14:
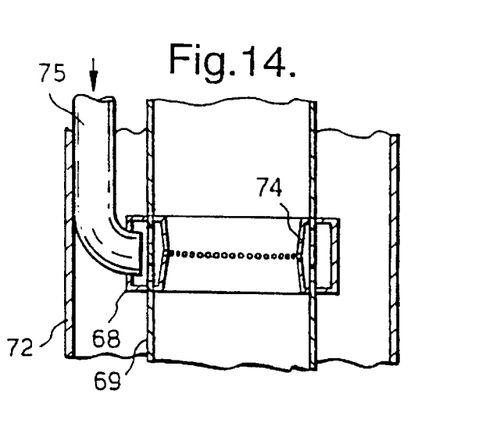
Figure 15:
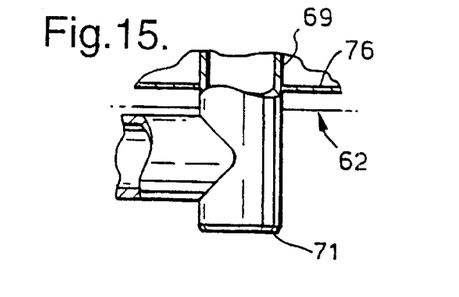

As in the foregoing embodiments the collecting vessel 61 includes an annular upper wall part 64 and an annular lower wall part 65 concentric with the upper wall part. The upper wall part 64 is a bellows the lower end of which is attached to the upper end of the lower wall part 65 and the upper end of which constitutes the crest K of a skimming weir formed by the bellows.

The bellows is made of polyurethane, for example, and at its upper end it is provided with an annular buoyancy body 64A of a low-density material. Accordingly, the upper wall part 64 possesses, in addition to a vertical flexibility, a certain buoyancy so that in operation it takes an overflow position with respect to the water surface surrounding the apparatus such that the inflow into the intake provided by skimming collection vessel 61 balances the outflow through the bottom portion of the collection vessel and the conduit 63, which may be rigid or flexible.

The separation vessel 62 is open both at the top and the bottom so that the interior of the collection vessel 61 is in constant open communication with the body of water in which the apparatus operates and so that the surface of the liquid in the separation vessel is readily accessible for removal of the pollutant layer collected in the separation vessel 62.

A buoyant body 66 is attached to and extends about the upper end of the separation vessel 62 such that in operation of the apparatus the upper end of the separation vessel is kept well above the surface of the surrounding water. A pair of cabinets 67 on the upper side of the buoyant body 66 houses control equipment and a blower (not shown) used to supply air to an air-lift pump 68 in the separation vessel as will be described below.

A vertical tube 69 is positioned centrally in the separation vessel 62 and held stationary therein by attachment means not shown. The lower end of this tube is in constant open communication with the conduit 63 through two of the branches of a T-connector 70. The third T-connector branch is directed downwardly and provided with a check valve, such as a trap-door 71, which is normally closed, e.g. under the influence of its buoyancy and/or a pressure differential, but can be opened under the weight of a heavy object, such as a piece of rock, entering the T-connector through the conduit 63.

The upper end 69A of the tube 69 is positioned at a such a level in the separation vessel 62 that in normal operation of the apparatus it is below the level of liquid in the separation vessel.

An outer tube 72 is concentric with the tube 69 and surrounds it to define an annular zone 73 around the tube 69. The upper end 72A of the outer tube 72 is at a level that in normal operation of the apparatus is well above the level of liquid in the separation vessel 62. The lower end 72B is situated in the lower portion of the collection vessel; the exact location is not particularly critical.

An air nozzle ring 74 forming part of the above-mentioned air-lift pump is mounted in the inner tube 69 at a suitable distance, e.g. 30–40 cm, below the upper end 69. A conduit 75 connects the nozzle ring 74 with a blower (not shown) in one of the cabinets 67 to feed air through a ring of openings in the nozzle ring into the water inside the tube 69. The rising air bubbles produce an upward flow of liquid from the collection vessel 61 into and through the tube 69.

The air supply to the nozzle ring 74 is adjusted such that the liquid flowing upwardly in the inner tube 69 and out of its upper end 69A is unable to reach the upper end 72A of the outer tube 72. Accordingly, the liquid will be deflected to flow downwardly through the annular zone 73 between the inner and outer tubes 69 and 72.

The cross-sectional area of the annular zone 73 is so chosen in relation to the cross-sectional area of the inner tube 69 that the flow velocity in the annular zone 73 will be substantially smaller than the flow velocity in the inner tube 69 but still large enough to carry the liquid to the lower end of the annular zone.

When exiting from the annular zone 73, the liquid, i.e. the mixture of water and pollutants, will be deflected by a deflector plate 76 secured to the inner tube 69 so that it will be directed generally horizontally into the separation zone B surrounding the outer tube 72. The horizontal cross-sectional area of the separation zone B is very large in relation to that of the annular transfer zone 73, and as the liquid flowing in the annular zone will have a low momentum when it exits from that zone, the pollutants will separate rapidly from the water in the separation compartment B and collect on the surface while the pollutant-free water will be discharged downwardly.

From the foregoing description it is seen that the liquid flowing from the intake device 61 to the separation vessel 62 is introduced in the separation vessel as an upwardly directed stream, then deflected to flow downwardly through a wider passage 73 and then deflected again, this time laterally and outwardly, and distributed over a very large cross-section. In this way, the velocity of the flowing liquid is successively and very substantially reduced along the flow path from the point of entry into the separation vessel and the separation zone.

As will be appreciated, a separation vessel according to the embodiment of the invention shown in FIGS. 10–15 can also be used with intake devices other than self-regulating immersed intake devices of the kind represented by the collection vessel 61 in FIG. 10. However, this separation vessel is particularly suitable for use with such a self-regulating intake device, because the inflow into the separation vessel can then be matched with the capacity of the separation system to handle the mixture to be separated.

Although the illustrated and described air-lift pump 69 is preferred because of its simplicity and the virtually unobstructed flow path, the flow of liquid from the intake or collection vessel 61 to the separation vessel 62 can be produced by other types of pumps and pumps positioned at various suitable places. For example, a pump may be positioned at the bottom of the collection vessel substantially as shown in FIGS. 1–9. Another possibility is to provide the separation vessel 62 with a bottom wall having an opening in which a pump is positioned to pump water out of the bottom region of the separation vessel and thereby maintain a difference in the liquid levels in the collection and separation vessels. Moreover, the pump may be installed in the conduit 63 inter-connecting the intake device and the separation vessel.

As will be readily appreciated, the collection vessel or other intake device 61 and the separation vessel 62 need not be positioned and operate in the same body of water. For example, the separation vessel 62 may be positioned in a separate tank which communicates through a suitable conduit with the body of water from which the intake device 61 collects the water carrying the pollutant to be separated so that the level of liquid in the tank is the same as the level of liquid in the last-mentioned body of water.

What is claimed is:

1. A method for recovering a buoyant pollutant carried by a body of water, comprising
   providing a skimming vessel (11, 61) in the body of water,
   forming a water sink in the skimming vessel (11,61),
   causing water carrying the pollutant to flow from the surface region of the body of liquid across a skimming weir (K) into the water sink,
   withdrawing water from the skimming vessel (11, 61) to maintain the water sink and cause the flow of water and pollutant entering the skimming vessel to proceed downwardly in the skimming vessel, and
   continuously diverting the downward flow of water and pollutant to a separation zone (B) for collecting the pollutant on the surface of the water therein,
   characterized by
   deflecting the downward flow of water and pollutant laterally away from a region (A) beneath the water sink to a separation zone (B) horizontally offset from said region beneath the water sink; and wherein the downward flow of water and pollutant is diverted to an annular separation zone (B) surrounding the region (A) beneath the water sink.

2. A method according to claim 1 in which the downward flow of water and pollutant is diverted omnidirectionally from said region (A) beneath the water sink to the separation zone (B).

3. Apparatus for separating water and a buoyant pollutant carried by the water, including
   an intake device (12,61) immersible in a body of water and defining an intake compartment (A) for receiving a flow of water and a buoyant pollutant entrained by the water,
   a pump device (19, 68) for discharging water from the intake device (12,61) to maintain a water sink therein and cause the flow of water and entrained pollutant entering the intake device to proceed downwardly in the intake compartment (A),
   a separation compartment (B) communicating with the intake compartment (A), and
   means (18, 19; 69, 72) for diverting the downward flow of water and entrained pollutant into the separation compartment (B),
   characterized in that
   the separation compartment (B) is horizontally offset from the intake compartment (A) and wherein the separation compartment (B) surrounds the intake compartment (A).

4. Apparatus for separating water and a buoyant pollutant carried by the water, including
   an intake device (12,61) immersible in a body of water and defining an intake compartment (A) for receiving a flow of water and a buoyant pollutant entrained by the water,
   a pump device (19, 68) for discharging water from the intake device (12,61) to maintain a water sink therein and cause the flow of water and entrained pollutant entering the intake device to proceed downwardly in the intake compartment (A), a separation compartment (B) communicating with the intake compartment (A), and means (18, 19; 69, 72) for diverting the downward flow of water and entrained pollutant into the separation compartment (B), characterized in that the separation compartment (B) is horizontally offset from the intake compartment (A) and disposed radially outwardly therefrom, an annular vertical inner wall (12,13) defining the intake compartment (A) and an annular vertical outer wall (15) defining together with the annular vertical inner wall (12,13) the separation compartment, an extension of the annular outer wall (15) defining a compartment (C) underlying the intake compartment (A) and the separation compartment (B) and providing communication between them, and an annular outlet passage (18) located adjacent the lower portion of the extension of the annular vertical outer wall (15) and communicating with the pump device (19).

5. Apparatus for separating water and a buoyant pollutant carried by the water, including an intake device (61) for receiving a flow water and buoyant pollutant entrained in the water, a separation vessel (62) defining a separation zone (B), and transfer means (63,68) for forwarding said flow of water and entrained pollutant to the separation zone, characterized in that the transfer means (63,68) includes an upwardly directed outlet conduit (69) having an overflow opening (69A) communicating with the separation zone (B) and situated at a level which is lower than an operating level of liquid in the separation zone (B); and a flow diverting device (72) for diverting the upwardly exiting overflow water and entrained pollutant from the outlet conduit (69) downwardly into an annular vertical passage (73) which surrounds the outlet conduit (69) and the lower end of which opens into the separation zone (B), wherein the separation zone (B) is disposed radially outwardly from said outlet conduit (69) and said flow diverting device (72).

\* \* \* \* \*